Dec. 30, 1924.

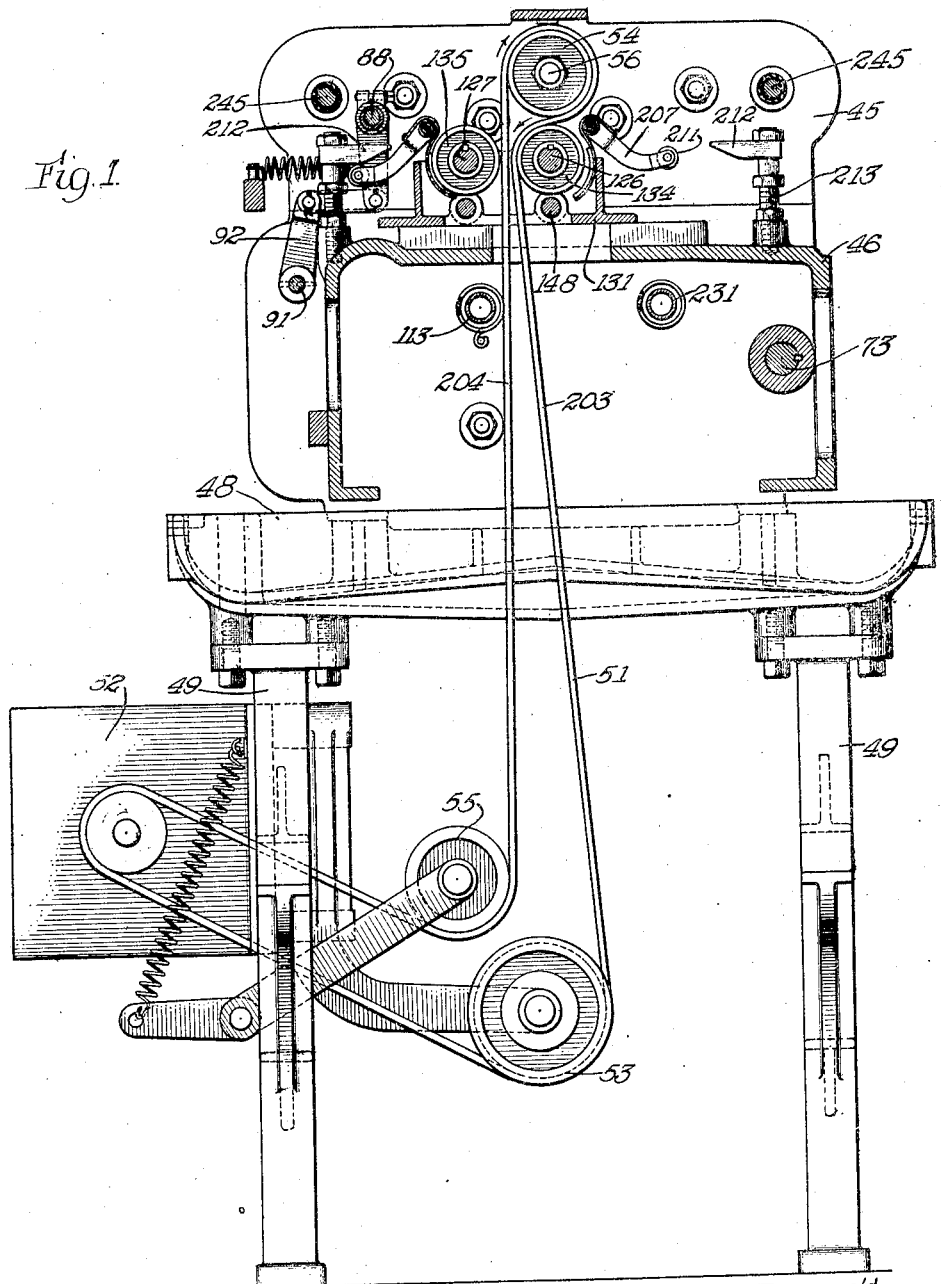

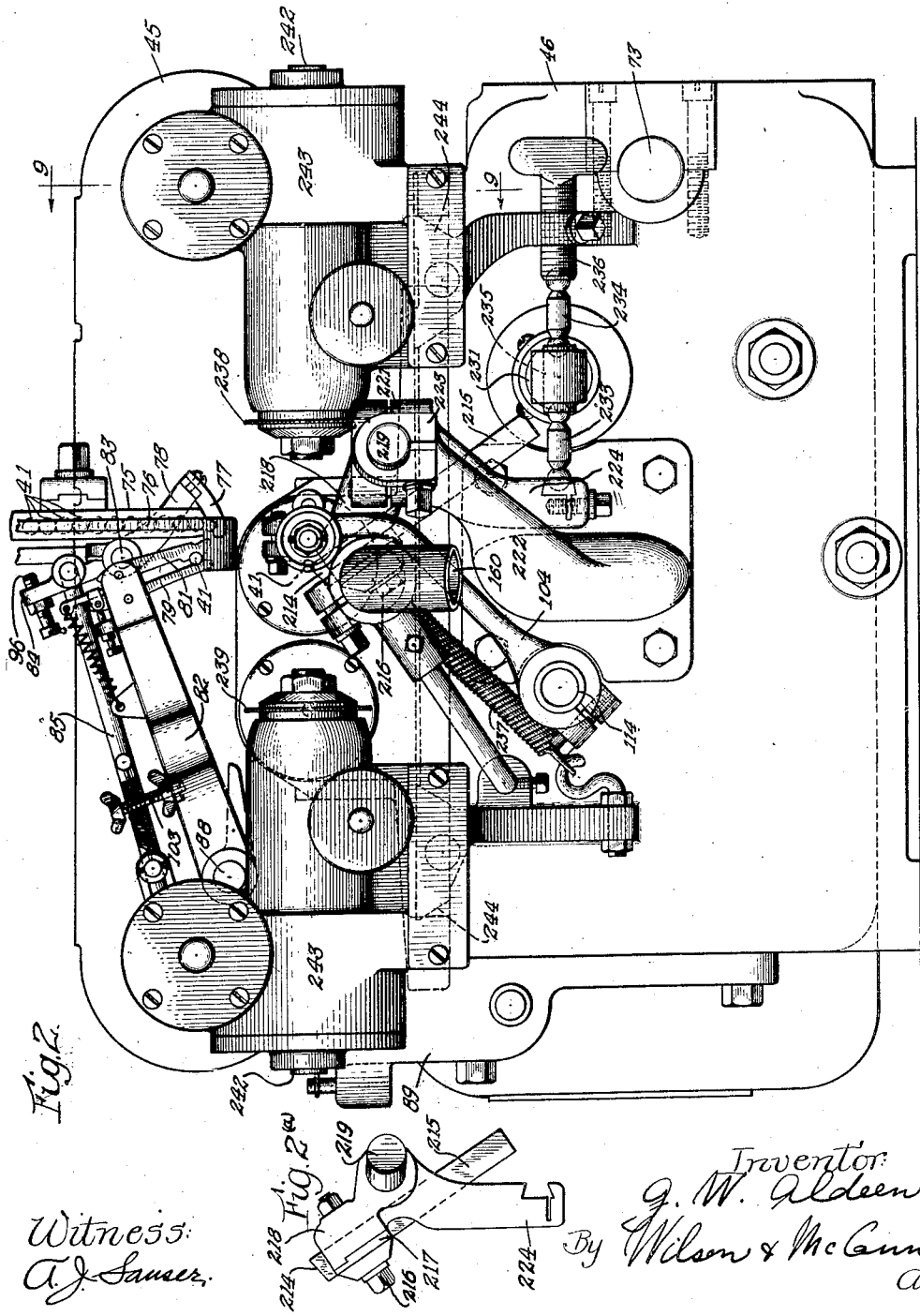

G. W. ALDEEN 1,520,684

SHAVING AND SLOTTING MACHINE

Filed Oct. 26, 1922      14 Sheets-Sheet 3

Dec. 30, 1924. 1,520,684
G. W. ALDEEN
SHAVING AND SLOTTING MACHINE
Filed Oct. 26, 1922 14 Sheets-Sheet 4

Dec. 30, 1924.

G. W. ALDEEN 1,520,684

SHAVING AND SLOTTING MACHINE

Filed Oct. 26, 1922    14 Sheets-Sheet 7

Dec. 30, 1924.

G. W. ALDEEN 1,520,684

SHAVING AND SLOTTING MACHINE

Filed Oct. 26, 1922

Witness:
A. J. Sauser.

Inventor:
G. W. Aldeen
By Wilson & McKenna
Attys.

Dec. 30, 1924.  1,520,684
G. W. ALDEEN
SHAVING AND SLOTTING MACHINE
Filed Oct. 26, 1922  14 Sheets-Sheet 9

Witness:
A. J. Sauser.

Inventor:
G. W. Aldeen
By Wilson & McKenna
Attys.

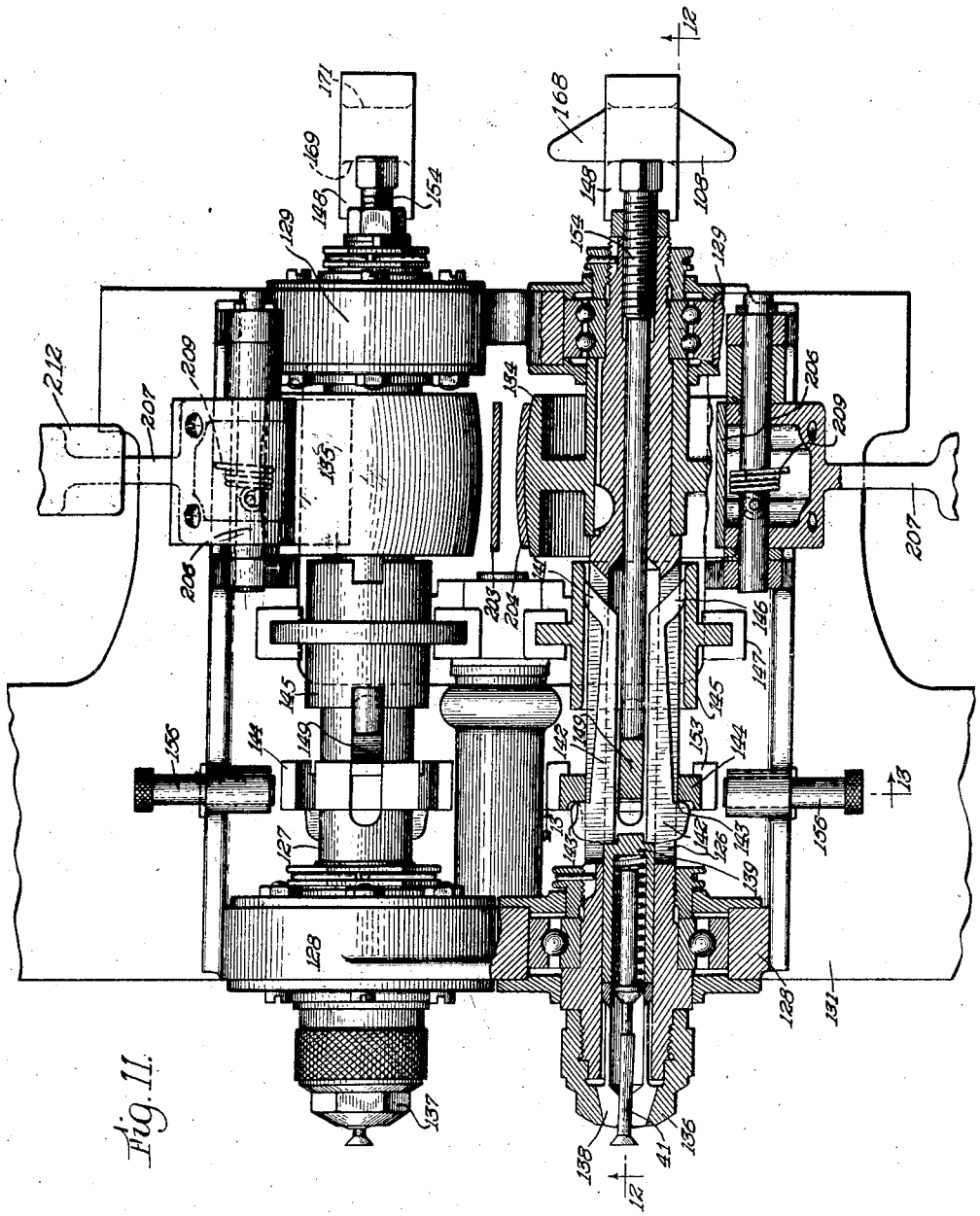

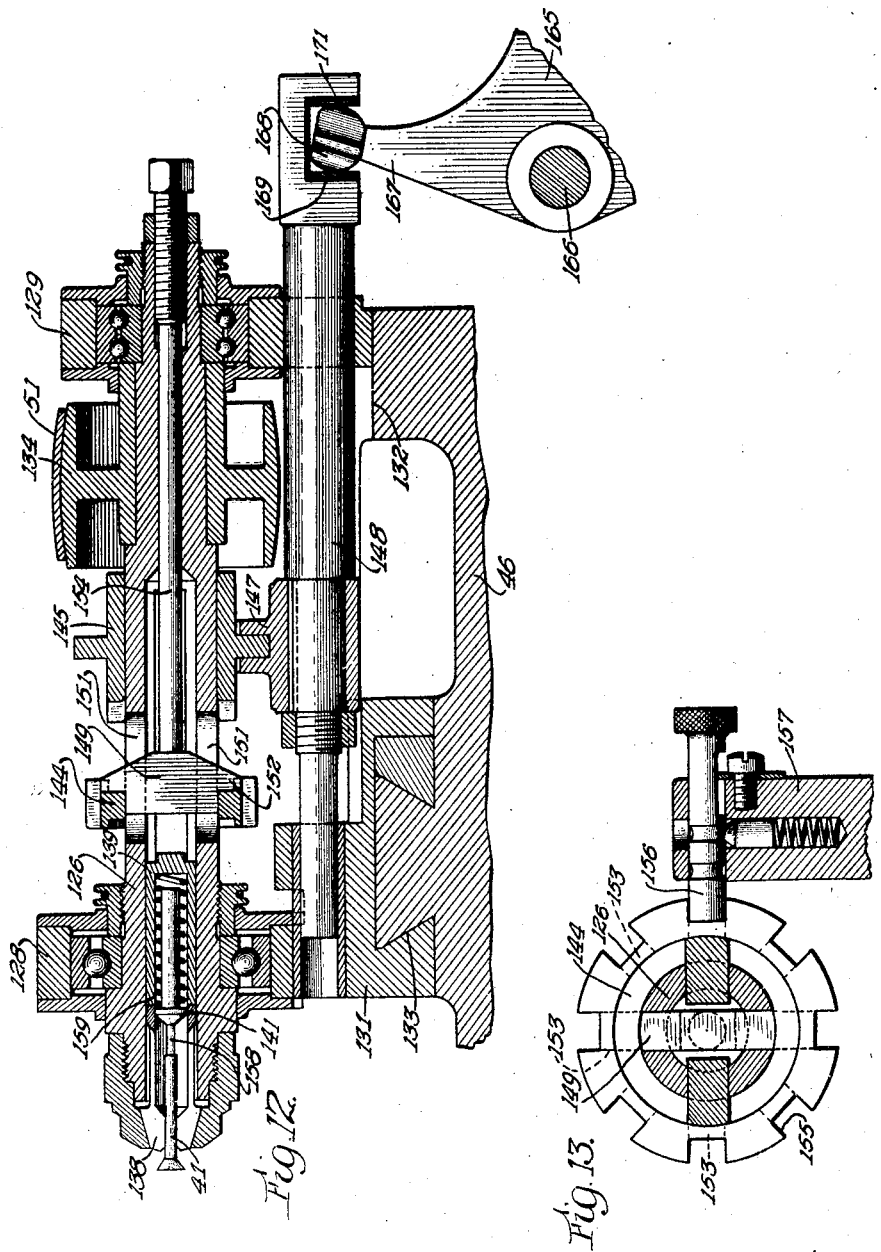

Dec. 30, 1924.
G. W. ALDEEN
1,520,684
SHAVING AND SLOTTING MACHINE
Filed Oct. 26, 1922    14 Sheets-Sheet 12
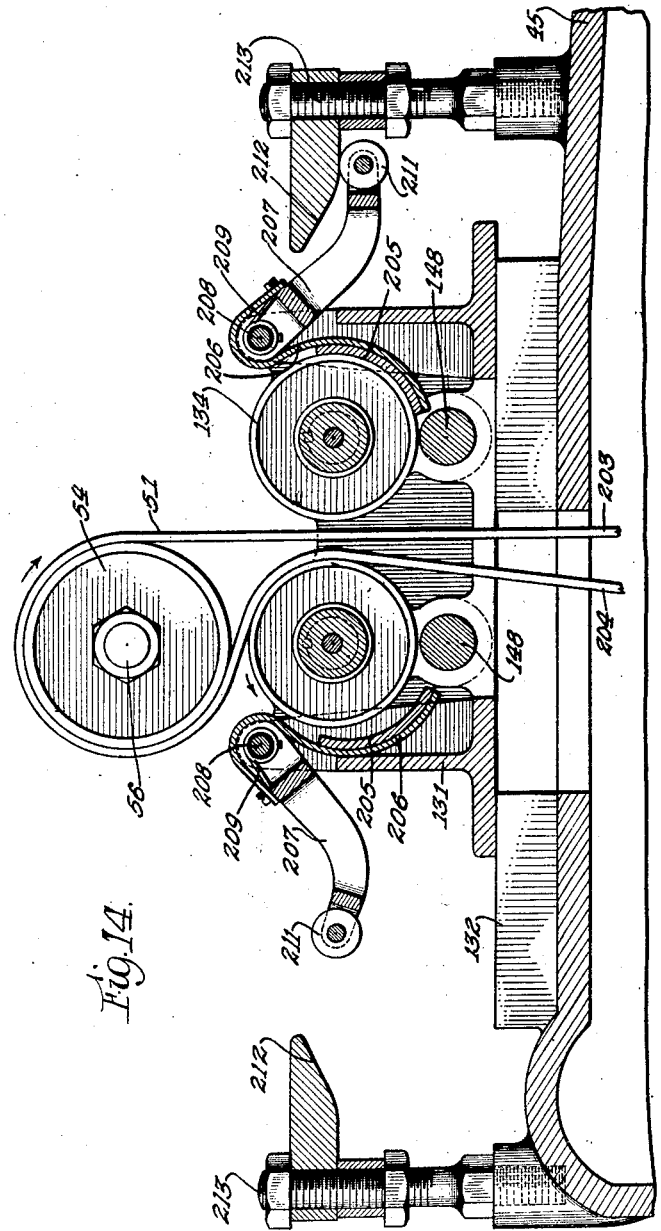
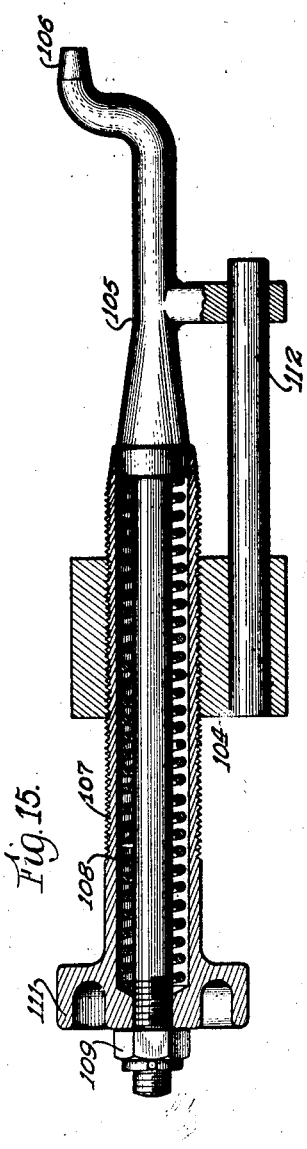

Dec. 30, 1924.

G. W. ALDEEN

SHAVING AND SLOTTING MACHINE

Filed Oct. 26, 1922   14 Sheets-Sheet 13

1,520,684

Witness:
A. J. Sauser.

Inventor:
G. W. Aldeen
By Wilson & McCanna
Attys.

Dec. 30, 1924.
G. W. ALDEEN
1,520,684
SHAVING AND SLOTTING MACHINE
Filed Oct. 26, 1922    14 Sheets-Sheet 14
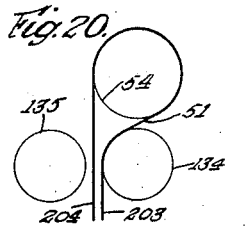
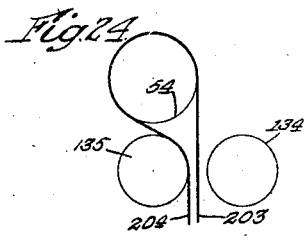
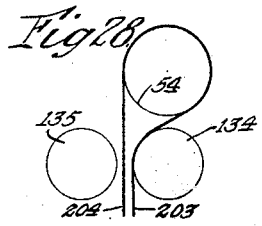
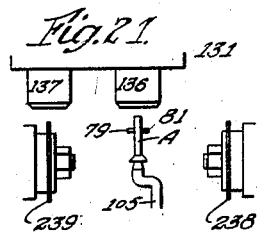
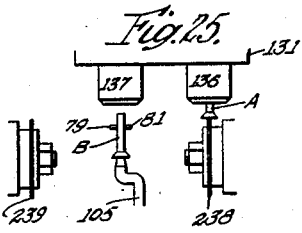
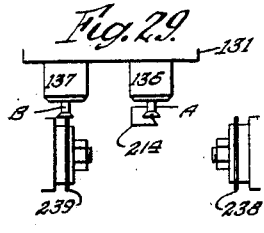
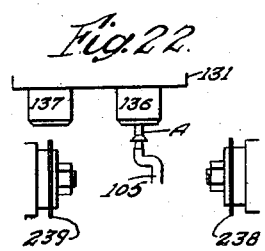
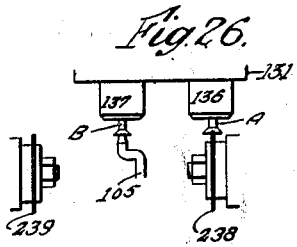
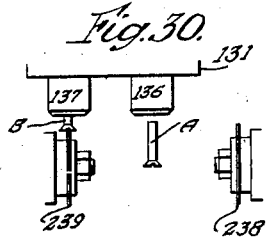
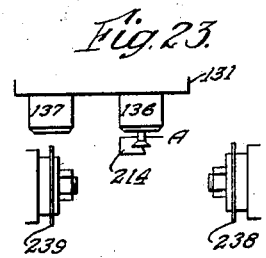
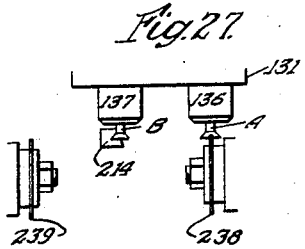
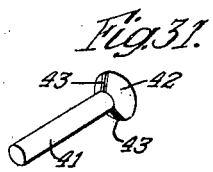
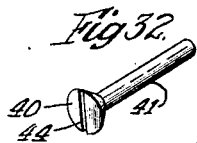
Inventor
G. W. Aldeen
by Wilson & McCanna
Attys.

Patented Dec. 30, 1924.

1,520,684

UNITED STATES PATENT OFFICE.

GEDOR W. ALDEEN, OF ROCKFORD, ILLINOIS, ASSIGNOR TO NATIONAL LOCK CO., OF ROCKFORD, ILLINOIS, A CORPORATION OF ILLINOIS.

SHAVING AND SLOTTING MACHINE.

Application filed October 26, 1922. Serial No. 597,089.

*To all whom it may concern:*

Be it known that I, GEDOR W. ALDEEN, a citizen of the United States, residing at Rockford, in the county of Winnebago and State of Illinois, have invented certain new and useful Improvements in Shaving and Slotting Machines, of which the following is a specification.

This invention relates to machines especially adapted for shaving and slotting blanks for making screws, bolts, rivets, etc., altho equally well adapted for turning operations instead of shaving and for milling operations other than slotting. In the instant case, it is desired to shave the top and bevel faces of a flat head screw and to slot the head for reception of a screw driver.

Heretofore, automatic machines have been provided for this work, but due to the mechanical principles involved they have not been entirely satisfactory for reasons, among others, that the mechanism is not positive in action and lacks precision and uniformity in operation. As a result, the cost of maintenance and operation of such machines is comparatively high, the capacity for quantity production is rather limited, and the finished produce varies from the desired standard.

The primary object of the present invention is to provide a generally improved machine of the character described which not only overcomes the objections referred to, but enables a considerable increase in production and greater uniformity of product.

My invention also aims to provide an automatic shaving and slotting machine embodying novel principles, which insure positive control and operation of the mechanism and adjustment thereof to a fine degree of accuracy. These principles explained hereafter, make for greater precision in the operation and control of the machine and greater economy in the cost of performing the shaving and slotting operations.

In furtherance of the foregoing, my invention contemplates the provision of improved mechanisms for performing certain operations, and the organization of these in a particularly advantageous manner. The objects and attendant advantages thereof will be better appreciated by those skilled in this art as the invention becomes better understood by reference to the following specification when considered in connection wth the accompanying drawings, in which—

Figure 1 is a front elevation partly in vertical section, of a machine embodying my invention, showing in particular, the drive;

Fig. 2 is a front elevation of the machine;

Figure 4:
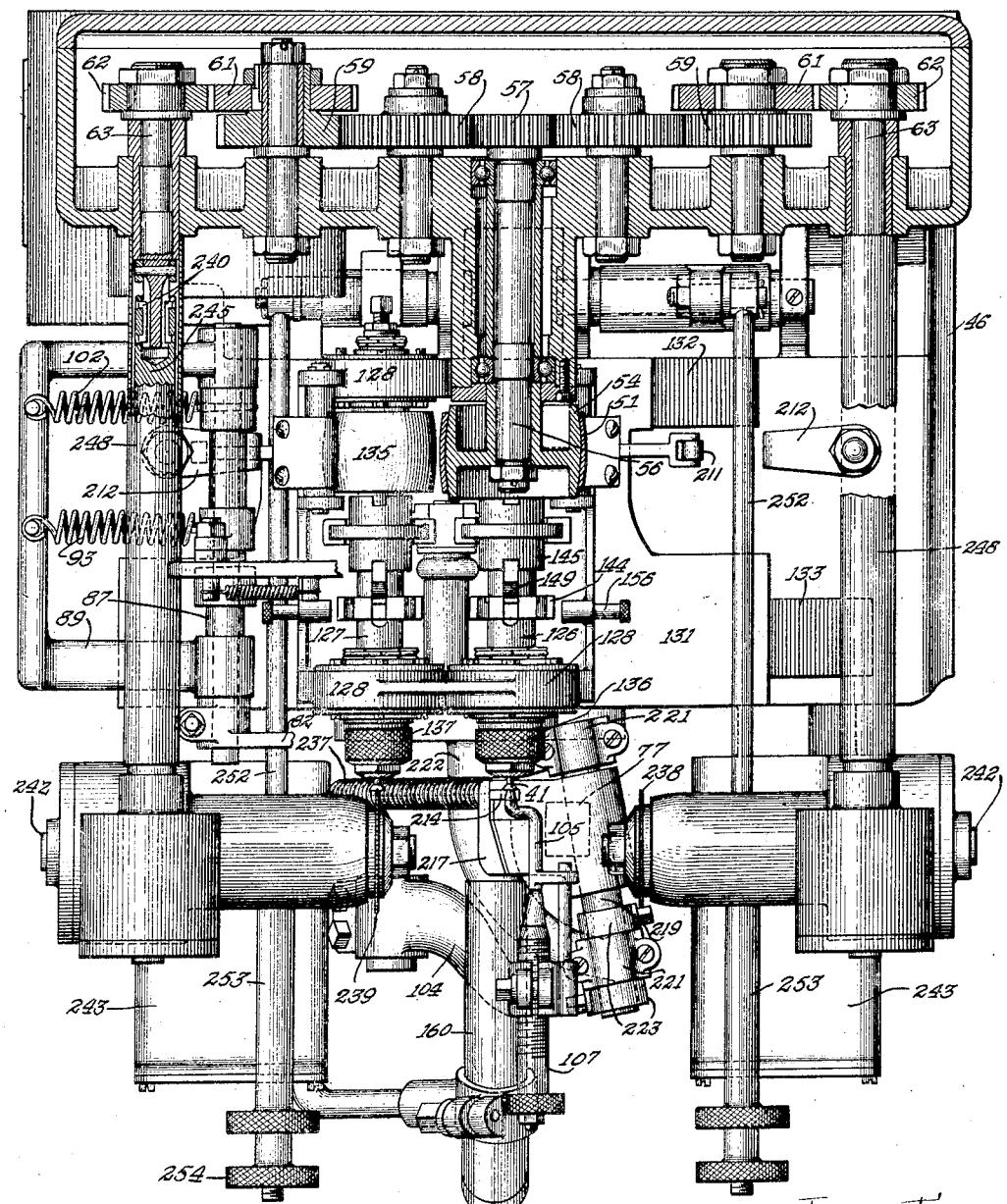
Figure 5:
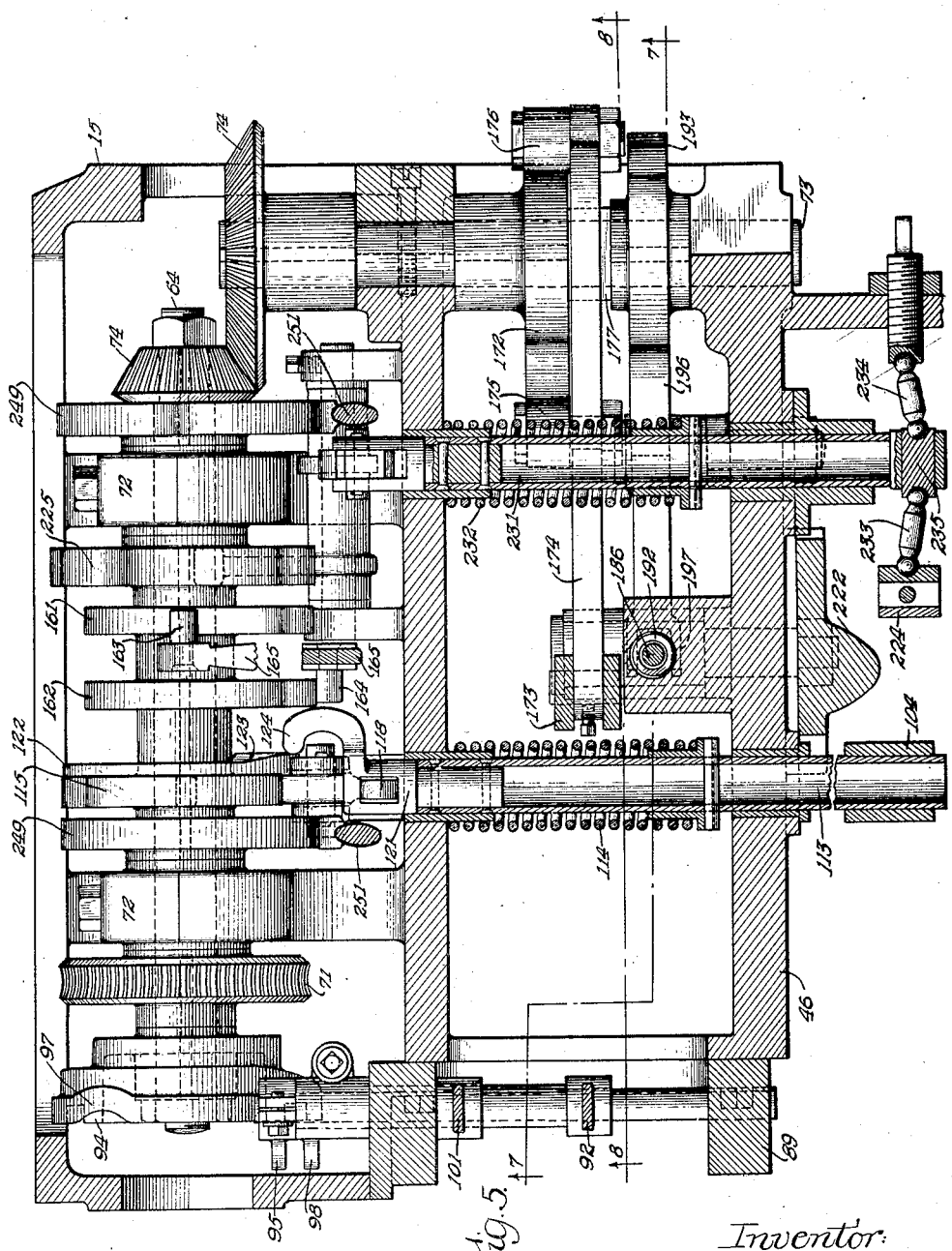
Figure 6:
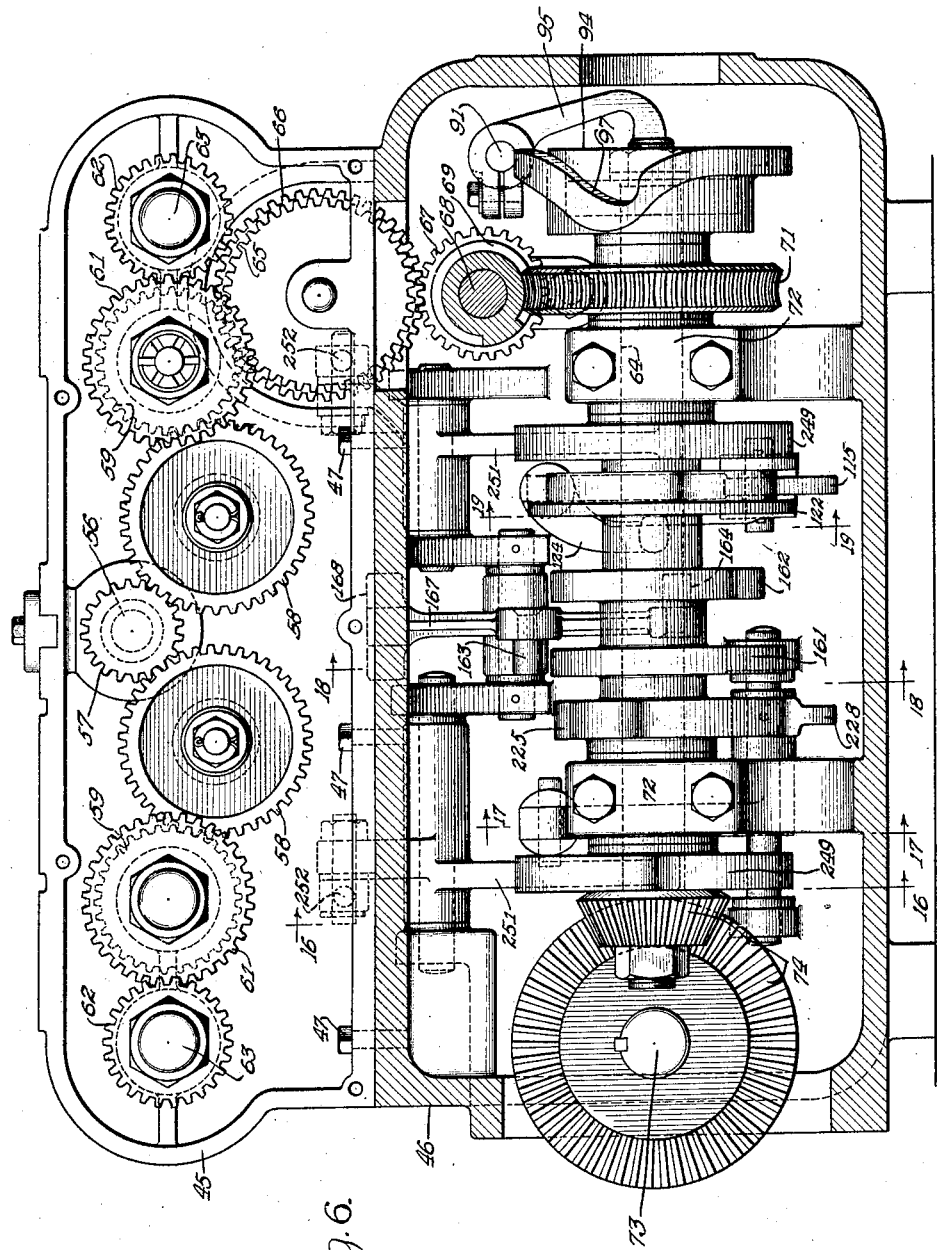
Figure 7:
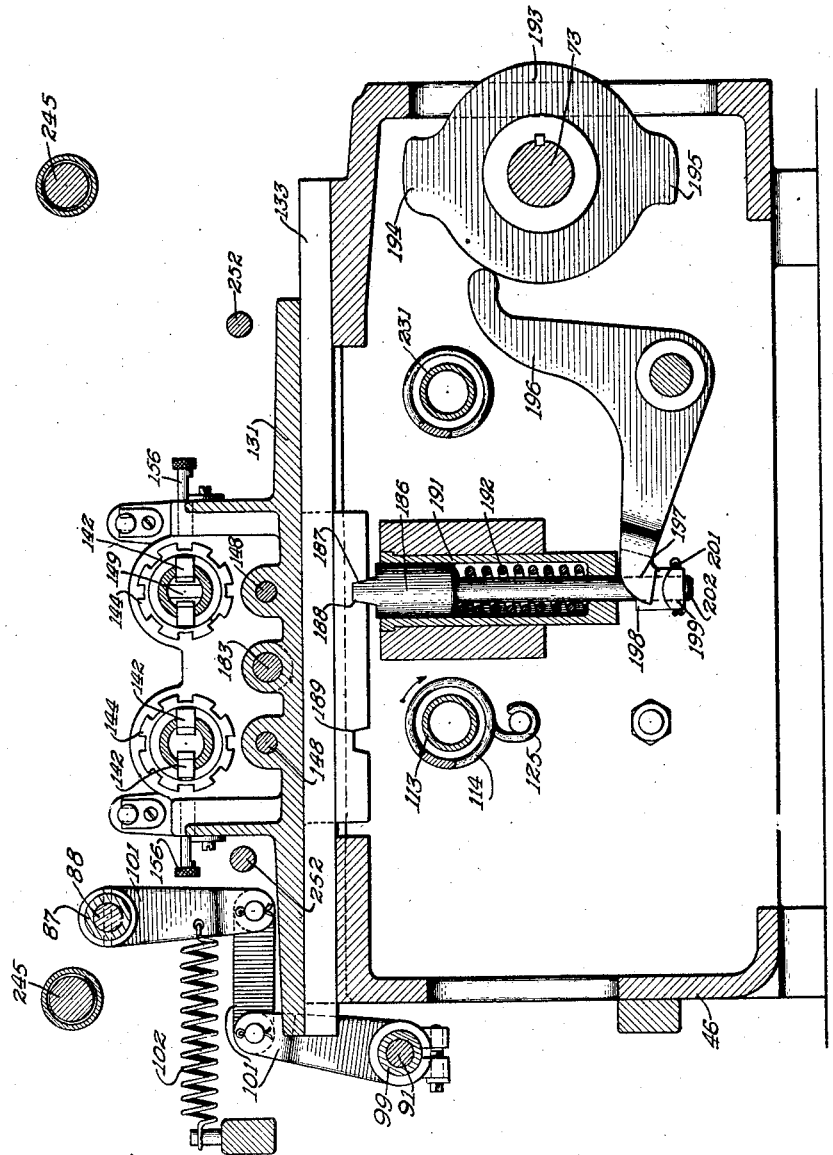
Figure 8:
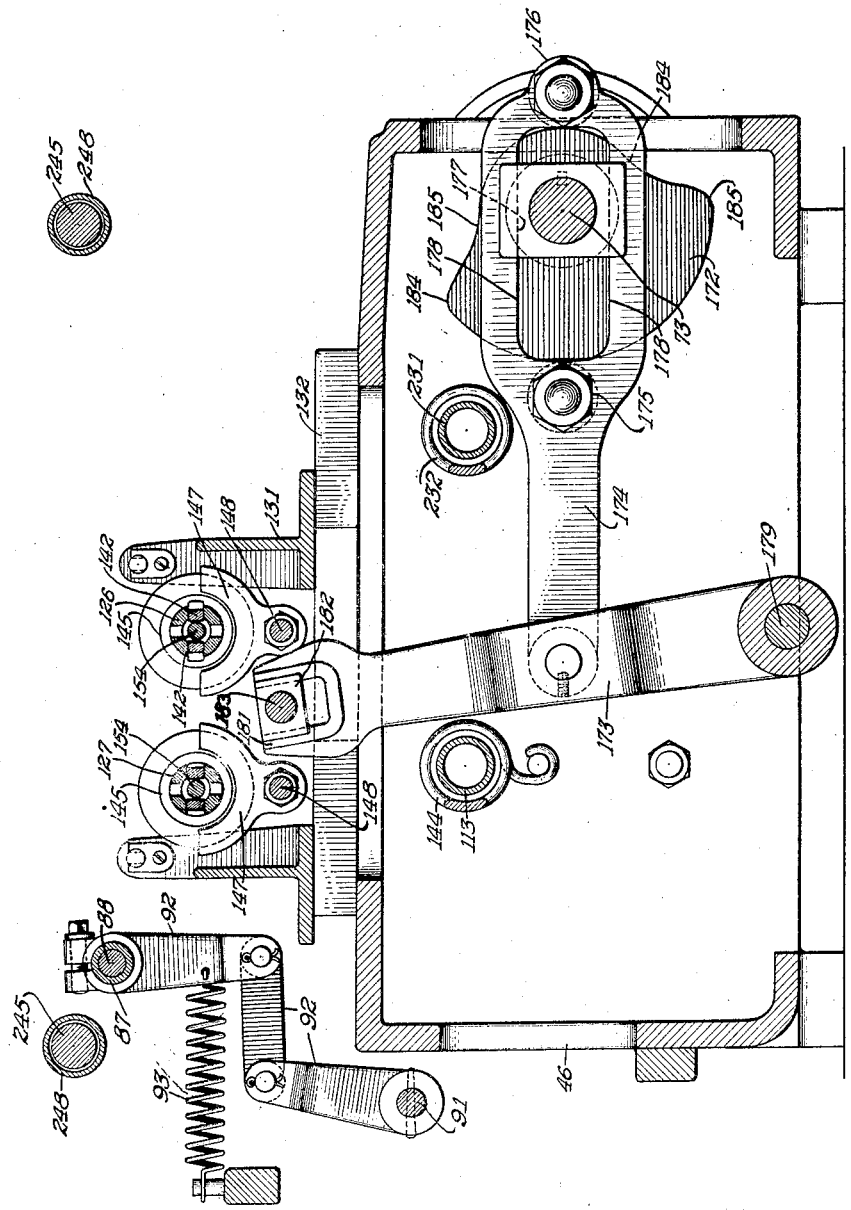
Figure 9:
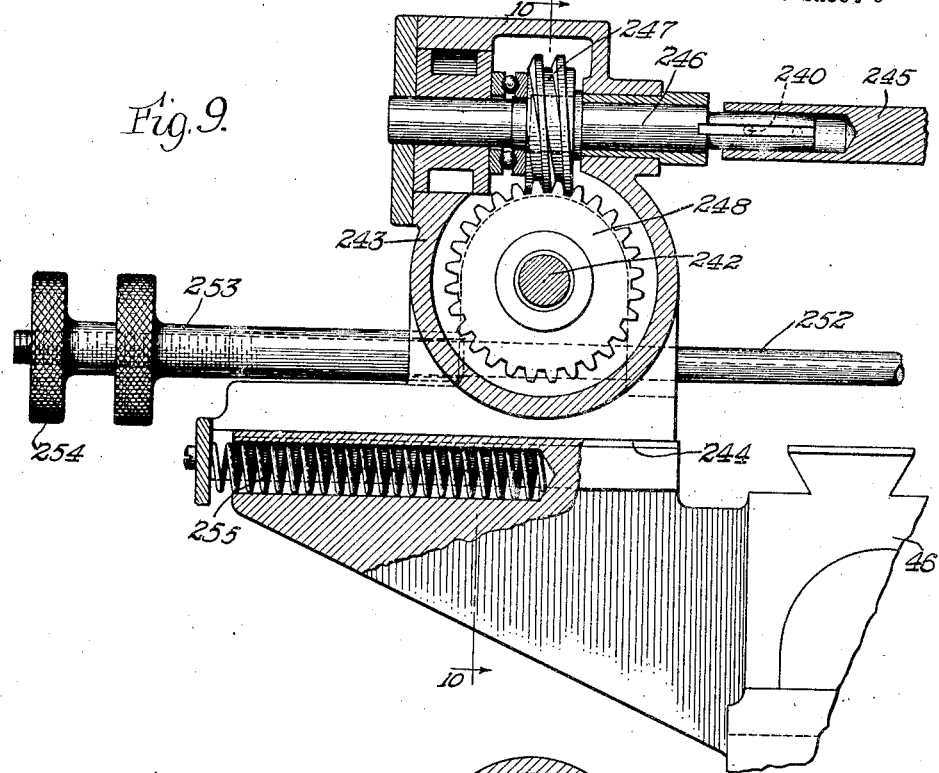
Figure 10:
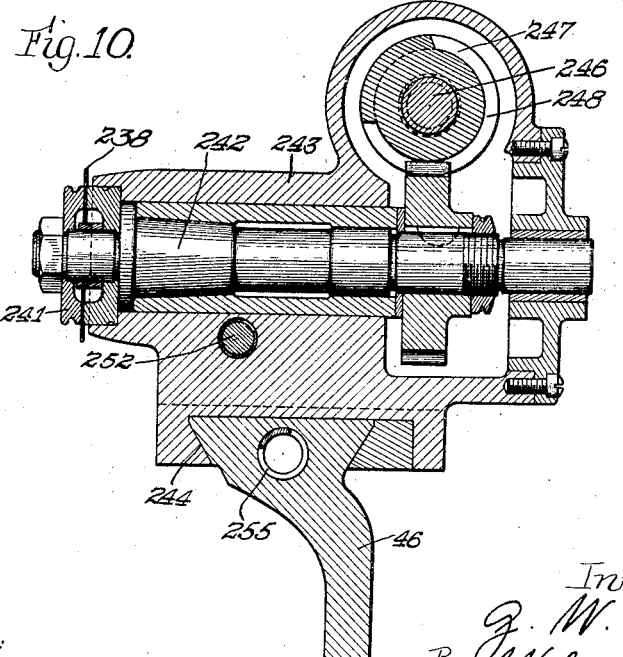
Figure 16:
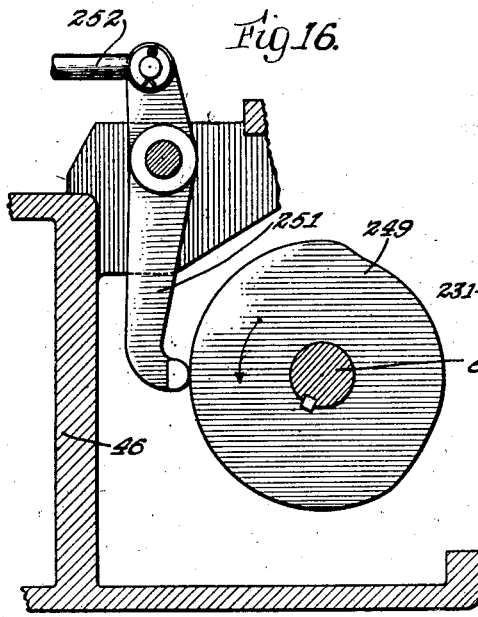
Figure 17:
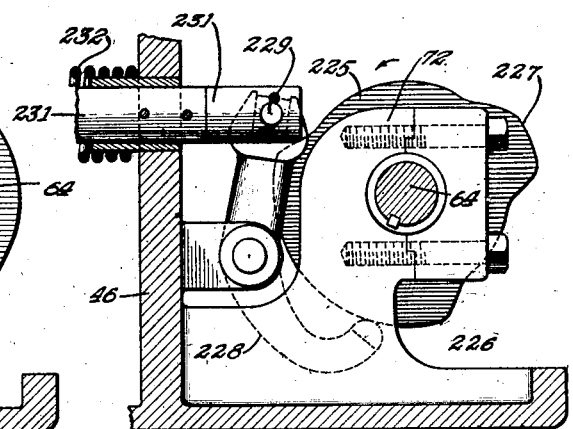
Figure 18:
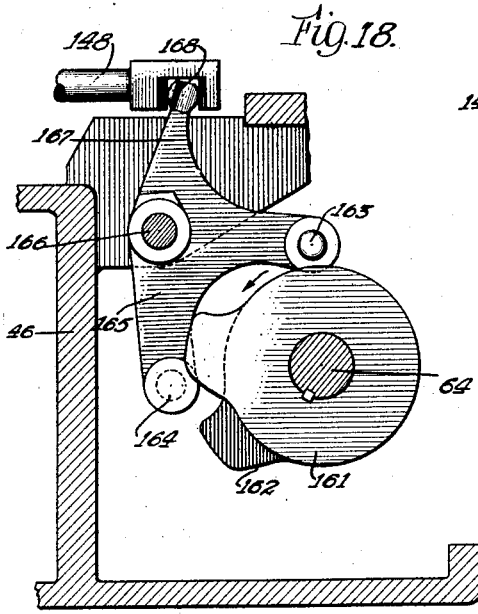
Figure 19:
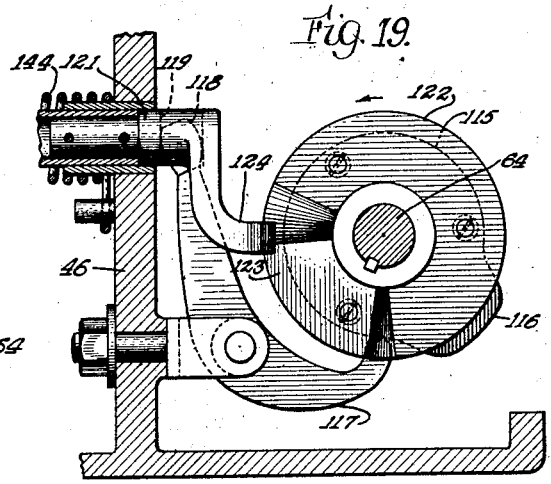

Fig. 2ª is a front view of the shaving tool holder, removed from the machine;

Fig. 3 is a side elevation, partly in section, to show the driving mechanism for one of the cam shafts;

Figs. 4 and 5 are plan sections taken substantially on the lines 4—4 and 5—5 respectively, of Fig. 3;

Fig. 6 is a rear section taken on the line 6—6 of Fig. 3;

Figs. 7 and 8 are vertical cross-sections taken substantially on the lines 7—7 and 8—8, respectively, of Fig. 5;

Fig. 9 is an enlarged section taken on the line 9—9 of Fig. 2;

Fig. 10 is a section taken on the line 10—10 of Fig. 9;

Fig. 11 is an enlarged plan view of the chuck spindles showing one in horizontal section;

Fig. 12 is a vertical section through one of the chuck spindles taken on the line 12—12 of Fig. 11;

Fig. 13 is a detail section taken on the line 13—13 of Fig. 11;

Fig. 14 is an enlarged section taken on the line 14—14 of Fig. 3;

Fig. 15 is an enlarged vertical section longitudinally through the blank-inserter;

Figs. 16, 17, 18 and 19 are sections taken on the line 16—16, 17—17, 18—18 and 19—19, of Fig. 6, showing respectively, the saw cam, shaving cam, chuck cams and inserter cams;

Figs. 20, 24 and 28 are diagrammatic views illustrating the spindle drive;

Figs. 21, 22 and 23, 25 to 27 inclusive, and 29 and 30 are diagrammatic views illustrating different operations on the blanks which will be explained more fully hereinafter;

Fig. 31 is a perspective view of a headed blank before the shaving and slotting operations; and Fig. 32 is a perspective view of the blank after these operations have been performed.

The principles disclosed herein are intended for application to machines for shaving, turning, slotting and milling headed blanks of any size, shape or proportions, such as are used in making screws, bolts, rivets, and similar articles. It should be understood, therefore, that my invention is in no way limited by reason of its present application to a machine for shaving and slotting flat headed screw blanks, but is applicable to the entire class of work referred to.

In the present example, it is desired to shave the top face 40 of a screw blank 41 shown in Figs. 31 and 32, and also the bevel face 42. In shaving the bevel face the burrs 43 left by the headers will be removed. It is also desired to slot the head at 44 and to perform a second shaving operation to remove the burr left by the slotting cutter. A brief outline of these operations will now be given, preparatory to a detailed description of the machine.

The blanks are fed one at a time by suitable mechanism from a hopper to an inserting position. The blank at this position will be inserted into a chuck, leaving the head of the blank projecting. A plurality of these chucks, two in the present instance, are mounted on a carrier, which is adapted to be shifted back and forth to carry the chucks alternately to the inserting position. This position I have termed the shaving station and at this station the chuck will be revolved and the shaving tool will be brought into operation for shaving the head of the blank. While this chuck is at the shaving station, the other chuck will be positioned at what I term a slotting station. Another slotting station is provided on the opposite side of the shaving station so that the latter is located between both slotting stations. A slotting cutter in the form of a rotary saw, provided at each of the slotting stations, is adapted to saw or mill a slot in the head of the blank held in the chuck located at its respective slotting station. Thus a shaving and a slotting operation will be simultaneously performed, one on the blank held in a first chuck and the other on the blank in a second chuck. The chuck carrier will then be shifted or indexed to position its first chuck at a first slotting station and its second chuck at the shaving station. The blank in the first chuck will be slotted as described, while the opposite slotting cutter will be idle, and the blank in the second chuck will be given a second shaving operation for removing the burr formed by slotting. This completes the blank in the second chuck, and it will be ejected and a new blank inserted. The carrier will then index in the opposite direction to again position the first chuck at the shaving station and the second chuck at its respective slotting station. The slotted blank in the first chuck will be given a second shaving for the purpose noted, and will be ejected, thus completing the cycle of operations for a single blank. This operation will be carried on seriatim, a blank being finished and ejected each time one of the chucks is moved to the shaving station. Mechanism is provided for revolving each chuck when it is positioned at the shaving station and for holding it against rotation at its respective slotting station. The means which I employ for this purpose is especially desirable because of its simplicity and practicability. It consists of a belt pulley fixed with respect to each chuck, as for example to a spindle which carries the chuck, and a drive belt both sides of which pass between said pulleys. Said belt is trained over a third pulley so located that upon indexing the chuck carrier in one direction the spindle pulley whose chuck is moved to the shaving station will be brought into driving contact with one side of the belt, while the other side will pass idly between the pulleys, thus revolving only the chuck at the shaving station. The other pulley will be held against rotation so that its chuck located at the slotting station will be held rigidly for the slotting operation. By indexing the chuck carrier, the respective spindle pulleys will be brought into and out of driving contact with one side or the other of the belt so that the drive for each spindle will be quickly and effectively established. The foregoing operations are performed with extreme rapidity, the finished blank being completed and ejected from the machine in actual practice at the rate of forty-four per minute.

*The frame and general driving mechanism.*

The frame may be of any suitable or preferred construction for supporting and accommodating the mechanism. At present I provide an upper and a lower frame part designated generally by 45 and 46 respectively, suitably secured together as by bolts 47 (Fig. 6). Said frame parts are supported on a base 48 in the form of a drain pan, which in turn is supported in an elevated position by legs 49. The machine is driven by an endless belt 51 as shown in Fig. 1. Any means may be employed for driving the belt, such for example as an electric motor 52, the driving shaft of which will turn in a clockwise direction viewing Fig. 1. The belt is trained over lower and upper pulleys 53 and 54, centrally mounted with respect to the frame; and a suitable take-up device, such as a spring-pressed pulley 55, is employed for holding the belt taut and allowing limited slack at certain times for a purpose described later. The pulley 54 fixed to a drive shaft 56 suitably journaled in the upper frame part 45 as shown in Fig. 4, drives a pair of cam shafts which operate the blank feeding, inserting, spindle opening and closing, and shaving mechanisms, which will be described later in the order given, and also drives the slotting cutters.

Referring more particularly to Figs. 4 and 6, it will be observed that the shaft 56 has a fixed spur pinion 57 which drives two opposed trains of gears suitably journaled on the frame part 45. Each gear train comprises a spur gear 58 meshing with said pinion 57 and a gear 59, concentric with and fixedly secured to a gear 61, which in turn meshes with a gear 62 fixed to the driving end 63 of a sectional shaft for driving one of the slotting cutters. One of said trains of gearing (at the right hand side of the machine viewing Fig. 6) drives a cam shaft 64 through the agency of concentric gears 65 and 66, the former meshing with the gear 59 of said train and the latter with a gear 67 fixed to a worm shaft 68, which carries a worm 69 in mesh with a worm gear 71, fixed to said cam shaft. This cam shaft 64, journaled in suitable bearing blocks 72 on the frame part 46, drives another cam shaft 73 through bevel gears 74 at a ratio of two revolutions to one of said cam shaft 73.

*The blank feeding mechanism.*

The blanks 41 may be fed one at a time to the inserting position referred to, by any suitable mechanism, that shown being simply for purpose of illustration. By reference to Figs. 2 and 3, it will be seen that said blanks are guided in single file in a conductor 75 having a guide 76 for the heads, and feed down by gravity, only a few of the blanks being shown in Fig. 3. In practice, the blanks are automatically fed to said conductor from a hopper by mechanism (not shown) forming no part of the present invention. The shank of the lowermost blank rests in a cradle 77 supported and adapted to be oscillated by an arm 78. By swinging said arm 78 in a clockwise direction from the normal position shown in Fig. 2, the blank resting in the cradle will be moved laterally into the path of a pair of pick-up fingers 79 and 81, carried by a pick-up lever 82 which is adapted to be oscillated for lowering the blank to the inserting position from which it will be inserted into a chuck as will be later described. The pick-up finger 81 is yieldingly urged into closed position by a suitable spring device to permit reception of the shank of a blank between the said fingers and to allow for axial ejectment of the blank.

The cradle arm 78 and pick-up lever 82 will be oscillated in timed relation by cam-operated mechanism to feed the blanks in succession to the inserting position, said mechanism being shown in Figs. 2, 3, 7 and 8. The cradle arm 78, mounted for oscillation about a shaft 83, has an upstanding arm 84 connected by a suitable link 85 to an arm 86, which is fixed to a sleeve 87. This sleeve is supported for oscillation on a rock-shaft 88, which is carried by a frame bracket designated generally by 89. By means of a lever and link connection 92, shown in Fig. 8, the sleeve 87 will be rocked by the shaft 91. A contractile spring 93 attached to said connection 92, urges the cradle laterally toward the pick-up fingers, such movement of the cradle being controlled by a cam 94 fixed to the cam shaft 64, which operates the rock shaft 91 through means of a follower lever 95. Such lateral advancement of the cradle may be limited and regulated by an adjustable stop 96 on the upper end of the cradle arm.

The pick-up lever 82 fixed to the rock-shaft 88 is adapted to be oscillated by operation of a side thrust cam 97 (Figs. 3 and 5), also fixed with respect to said cam shaft 64, the operating connection comprising a follower lever 98 fixed to a sleeve 99 loose on the rock shaft 91, and a lever and a link connection 101 (Fig. 7) between said sleeve 99 and rock-shaft 88. A contractile spring 102 urges the cam-follower lever 98 against the cam 97; and an adjustable stop 103 (Fig. 2) attached to the lever 82 will strike a fixed member such as a lug shown directly below it for limiting advance of the pick-up arm to the inserting position.

The cams 94 and 97 are so shaped as to operate the cradle and pick-up fingers at the proper times for moving the cradle into and out of the path of said fingers and for lowering the latter to pick up a blank from the cradle, raising the blank and withdrawing the cradle, and then lowering the blank to the inserting position.

*The inserting mechanism.*

The inserter, a detail of which is shown in Fig. 15, is carried by an arm 104 in the location shown in Figs. 2 and 5; and by means of cam-operated mechanism said arm is adapted to be operated for moving the inserter sidewise into and out of alignment with a blank and longitudinally for inserting the blank into a chuck. In Fig. 4, the inserter has finished inserting the blank. The inserter finger 105 having an offset end 106, is supported with capacity for longitudinal movement within an adjustable sleeve 107 threadingly engaged in the upper end of the arm 104. Said inserter finger may be retracted within the sleeve against the pressure of a compression spring 108 and its movement in the opposite direction is limited by a stop nut 109 on the shank end of the finger. The sleeve 107 has a knob 111 for convenience in adjusting the sleeve and inserter finger bodily on the arm 104 for the purpose of accurately positioning the inserter with respect to the particular blank to be inserted. A guide rod 112 prevents rotative displacement of the inserter finger.

The arm 104 which carries the inserter is fixed to a shaft 113 (Fig. 5) mounted for oscillation and reciprocation on the frame part 46. A coil compression spring 114 on said shaft serves to urge the latter forwardly to hold the inserter in an idle position. An irregular profile cam 115, shown in Figs. 5, 6 and 19, fixed to the cam shaft 64, has a raised portion 116 adapted to actuate a follower lever 117, which has an upper end 118 disposed in a slot 119 in an extension part 121 fixed to the shaft 113. The function of said cam is to positively move the shaft 113 and consequently the inserter, forward at a predetermined time, for inserting a blank. It will be noted, however, that an oscillating movement is also imparted to the shaft 113 for the purpose of swinging the end 106 of the inserter laterally into and out of alignment with the blank. This oscillation is imparted by a side thrust cam 122, also fixed on the cam shaft 64, having a raised portion 123 adapted to actuate a follower lever 124 fixed to the shaft part 121.

In operation, the raised portion 123 of the side-movement cam positively moves the inserter sidewise to the left from its normal to the full-line position shown in Fig. 2, in which the end 106 of the inserter finger is in alignment with a blank to be inserted, and the cam portion 116 advances the inserter to the position shown in Fig. 4 for inserting the blank, it being noted that the inserter is held in such alignment by the flat side of the cam portion 123 until after the blank has been inserted. Both said side and longitudinal movements imparted to the inserter are opposed by the pressure of the spring 114 which is fastened at one end 125 to the frame as shown in Fig. 7, and at its opposite end to the shaft 113, so that the inserter will be returned by this spring to its normal position after the high portions 116 and 123 have passed their respective followers.

*The chuck and spindle mechanism.*

The chucks referred to above for holding the blanks are carried by spindles designated generally by 126 and 127 shown in detail in Figs. 11 and 12. Said spindles, spaced apart laterally in a horizontal plane, are supported at opposite ends for rotation in suitable bearings housed within casings 128 and 129 fixed on a carrier designated generally by 131. This carrier slidably supported on a flat way 132 and a dove tail way 133 extending crosswise of the machine, is adapted to be moved back and forth on said ways for indexing the spindles, that is, for shifting them from one station to another, as will be presently more fully described. The spindle 126 is equipped at its rear end with a fixed pulley 134 and at its front end with a chuck designated generally by 136, and the spindle 127 is similarly equipped with a pulley 135 and chuck 137. Inasmuch as the spindles and chucks are of similar construction, a description of one will suffice; and like reference numerals refer to similar parts, except where particularly applied to the contrary.

Referring more particularly to the spindle 126 shown in horizontal section in Fig. 11 and vertical section in Fig. 12, it will be observed that the blank 41 is centered and gripped by spring collet jaws 138. The collets are held in this closed position by the forward thrust of a chuck-closing shoe 139 which bears at its forward end against the collet ring 141. Said shoe is held in the forward position by a pair of levers 142 fulcrumed at 143 on a collar 144 fixed against movement rotatably and axially with respect to the spindle, although adjustable axially as will presently appear. Said levers bear at their forward ends against the rear end of the chuck-closing shoe 139 and are adapted to rock on said fulcra 143 for opening and closing the collets. A collar 145 slidable longitudinally on the spindle 126 is adapted, when moved rearwardly thereon, to over-ride the rear ends 146 of said levers, thereby closing the chuck as shown, and to be moved forwardly clear of said rear ends for permitting the latter to expand and release the shoe 139, thereby allowing the spring collets to expand sufficiently to release the blank. The collar 145 may be moved forwardly and rearwardly for opening and closing the chuck by any suitable means, such for example as a yoke 147 engaging an annular flange upon said collar and carried by a cam-operated rod 148 axially slidable on the carriage 133 directly beneath the spindle. The lever-seat collar 144 is held against rotation and movement rearwardly on the spindle by means of a key 149 disposed diametrically of the spindle in slot-ways 151. The ends 152 of this key are adapted to enter any of a plurality of circumferentially spaced sockets 153 in the rear of said collar 144. Said key bears at its rear end against an adjusting rod 154 which is threaded at its rear end in the spindle and adapted to be adjusted axially therein, a lock nut being provided for securing said rod against displacement from its set position.

From the foregoing, it will be manifest that by sliding the rod 148 forwardly, that is, to the left viewing Fig. 12, the chuck will be opened by release of the rear ends 146 of the chuck-opening and closing levers, and that by the reverse movement of said rod, the chuck will be closed by lever action. By screwing the rod 154 forwardly in the spindle, the lever-seat collar 144 will be advanced for closing the collets sufficiently to accommodate blanks of small diameter. Reverse adjustment of the rod 154 opens the chuck for larger diameters as will be obvious. In practice, however, separate collets are employed for each size of blank, and fine adjustment for properly gripping the blank is obtained by means of said adjusting rod 154.

When making this adjustment or when removing the chucks, it is necessary to hold the spindle against rotation and to facilitate this, I have provided the lever-seat collar 144 with peripheral notches 155 (Fig. 13) in any of which a plunger 156 carried by an upstanding part 157 of the carriage is adapted to enter, thereby locking the spindle. After the adjustment has been made, the plunger 156 will be withdrawn and held in an inoperative position, as will be obvious.

A blank upon being inserted into the chuck, will strike an ejector 158 disposed within the chuck-closing shoe 139 and retract it against the pressure of a spring 159. Upon opening the chuck, the blank will be instantly ejected by release of the stored up spring pressure, and discharged through a chute 160 supported on the frame with capacity for adjustment into alignment with the ejected blank.

A single cam means employed for actuating each chuck opening and closing rod 148 in alternation, is shown in Figs. 6, 11, 12 and 18. This means comprises a pair of irregular cams 161 and 162 fixed to the cam shaft 64, the former of which cams has a raised portion adapted to actuate a pin 163 and the latter a pin 164, carried by a lever 165 fulcrumed at 166 on the frame part 46. Said lever has an upstanding arm 167 terminating in a laterally elongated head 168 adapted to enter between opposed seats 169 and 171 on each chuck-actuating rod 148. In the position of the parts shown, the raised portion of the cam 162 has left the pin 164 after having swung the lever 165 in a clockwise direction viewing Fig. 18, and thereby swung the upper end 168 of the lever rearwardly against the seat 171, so as to close the chuck. The chuck will remain closed until the raised portion of the cam 161 rides under the pin 163 which has previously been moved into its path by the chuck-closing movement of the lever 165. Said cam 161 will, therefore, rock the lever 165 in a counter-clockwise direction, thereby throwing the upper end of said lever against the seat 169, forcing the rod 148 forwardly and opening the chuck.

The means for indexing the spindles is shown in Figs. 5 and 8. Said means comprises a cam 172 fixed to the cam shaft 73 and adapted to be revolved in a counter-clockwise direction viewing Fig. 8, for rocking the carrier slide lever 173 back and forth through the agency of a link 174. This link carries a pair of follower rollers 175 and 176 which are maintained on diametrically opposite sides of the cam 172 by a guide block 177 loose on the cam shaft 73 and co-operating with the ways 178 on said link 174. The lever 173, fulcrumed at its lower end on a pin 179, has a bifurcated upper end 181 which slidably receives a block 182 loose on a pin 183 which is fixed to the spindle carrier.

It will be manifest viewing Fig. 8, that upon rotation of the cam 172, the carrier will remain stationary until the points 184 reach the rollers 175 and 176, whereupon the carrier will be indexed to the right, thereby moving the spindle 127 to the position now occupied by the spindle 126. The spindle carrier remains stationary until the points 185 reach the roller followers and commence the second indexing operation for returning the spindles to the position shown. During one complete revolution of the cam, the spindle carrier will be indexed twice.

During each period that the spindle carrier is at a stand, it will be locked against displacement by a locking pin 186, shown in Fig. 7. This locking pin has a beveled nose 187 adapted to enter either of the sockets 188 and 189 in the underside of the spindle-carrier. Said locking pin, supported in a stationary casing 191 on the frame, is urged upwardly by a coil compression spring 192 for engagement in the respective sockets and is adapted to be withdrawn therefrom by the action of a cam 193 fixed to the cam shaft 73. This cam has diametrically opposed raised portions 194 and 195 adapted to successively actuate a follower lever 196, which has a bifurcated end 197 (Fig. 5) straddling the square upper end 198 of a collar 199 which is suitably secured as by a cotter pin 201, to the lower end of the locking pin. When the follower lever 196 is actuated in a counter-clockwise direction by the cam 193 moving in a similar direction, viewing Fig. 7, its bifurcated end 197 will strike the curved seats 202 on opposite sides of the collar 199 and withdraw the locking pin, thereby permitting the spindle carrier to be indexed. The locking pin will be released by the cam at the proper time so as to enter into locking engagement with the spindle carrier under the influence of the spring 192 after said carrier has been indexed. It will be observed that the locking pin will be withdrawn twice during each complete revolution of the cam shaft 73 in order to lock the spindle carrier at the two indexed positions required for a complete cycle of operations, which will be explained more fully hereinafter.

The shaving and slotting operations referred to in the above outline, are performed at what I term shaving and slotting stations identified by the indexed positions of the chuck spindles. Referring to Figs. 1 and 4, it will be observed that the spindle carrier is in a position with its spindle 126 disposed in the vertical plane of the drive shaft 56, which is located centrally on the machine. In this position, the first chuck 136 carried by the spindle 126 is disposed at the shaving station, shown plainly in Fig. 4, and the second chuck 137 carried by the spindle 127, at a slotting station. When the spindle carrier is indexed to the right as explained above, the chuck 137 will be moved to the shaving station and the chuck 136 to another slotting station. For purpose of clarity, I will refer to the chuck 136 and its slotting station as the "first chuck" and "first slotting station," and the chuck 137 and its slotting station as the "second chuck" and the "second slotting station."

It is desired to drive each spindle while it is positioned at the shaving station and to lock each spindle against rotation when it is moved to its respective slotting station. This I accomplish in a very simple and practical manner by the belt drive above described, which at the same time continuously drives the shaft 56. As shown in Figs. 1 and 14, both sides of the belt pass between the spindle pulleys 134 and 135. Both the drive and slack sides (with respect to the pulley 54) 203 and 204 respectively, of the belt pass between the spindle pulleys 134 and 135, and each side functions alternately as a driving side for driving one of said spindles pulleys. That is, when the spindle 126 is positioned at the shaving station, as shown in Fig. 1, the belt side 202 will be in driving contact with the pulley 134 and the belt side 204 will be idle with respect to the pulley 135. When said spindles are indexed to the opposite position as shown in Fig 14, the belt side 204 will be in driving contact with the spindle pulley 135 and the belt side 203 will be idle. It will thus be seen that by shifting the spindle carrier back and forth, the spindles will be alternately driven by a common driving means, and that the drive is instantly established for one spindle and stopped for another by the act of indexing.

In order to quickly stop each spindle when it is moving to its respective slotting station and to hold it against rotation, I have provided a braking device for each spindle pulley. Referring to Fig. 14, each braking device comprises a friction brake shoe 205 carried by the resilient end 206 of a lever 207 pivotally mounted at 208 on the spindle carrier. A suitable coiled spring 209 on the lever pivot shaft 208 tends to urge the lever in a direction to withdraw its friction shoe from its respective pulley and to simultaneously position a roller 211 in the horizontal plane of a cam 212 supported in a stationary but vertically adjusted position on a fixed post 213. The stationary cams 212 are so positioned that as each spindle is moved to its slotting position, its driving pulley will be frictionally engaged by its respective brake when the roller 211 of the braking device is moved into engagement with its cam 212. This brake quickly stops the spindle and holds it against rotative displacement.

From the foregoing, it will be manifest that a number of functions are performed by moving the spindle carrier back and forth, consisting of indexing the spindles and driving and stopping them as required at the several stations. It will be here noted, viewing Fig. 11, that when each spindle is moved to the center or shaving station, its chuck opening and closing rod 148 will be moved into co-operative relation with the end 168 of the cam-operated lever 165 which transmits the chuck opening and closing movements.

*The shaving mechanism.*

The faces 40 and 42 of the blank will be finished by a shaving tool 214 (Figs. 2, 2ª and 4). The tool bar 215 is rigidly secured by means of a bolt 216 and clamp 217 to a holder 218 which has trunnion ends 219 journaled in bearings 221 carried by a bracket 222 bolted to the frame part 46. The shaving tool holder is mounted for oscillation on its trunnion bearings which are disposed in a horizontal plane, as shown in Fig. 2, and at an angle with respect to the spindle axes, as shown in Fig. 4. Collars 223 secured at one of the trunnions 219 at both sides of its bearing prevent axial displacement of the tool holder and permit adjustment of the cutting end of the tool longitudinally with respect to the blank. The tool holder has formed integrally therewith a depending arm 224 adapted to be actuated by a rotary cam 225 (Fig. 17) through the intermediary of a toggle-joint connection for imparting a smooth, steady feed motion to the tool in such manner as to avoid chattering and to insure a high degree of accuracy and precision in the shaving operation. The cam 225, fixed to the cam shaft 64, has a raised portion 226 for imparting a first shaving feed and a raised portion 227 for a second shaving feed. Said cam actuates a follower lever 228 having a suitable pivotal connection at 229 with a rod 231 (Fig. 5) mounted for horizontal sliding movement in the frame part 46. A coil compression spring 232 constantly urges the shaft 231 forwardly and holds the follower 228 against the cam. Longitudinal movement of the rod 231, imparted by the shaving cam, is transmitted through a toggle-joint, to the depending arm 224 of the tool holder for feeding the tool into the blank. This toggle-joint, shown in Figs. 2 and 5, comprises arms 233 and 234, each having a ball and socket connection at its inner end with a block 235 fitted in the forward end of the rod 231 for movement transversely thereof. One of said arms is connected at its outer end with the lower end of the tool holder arm 224 and the other with an abutment in the form of a screw 236 threadingly engaged in a frame part. By adjustment of the screw 236, the depth of the feed may be regulated to a nicety. By interposing a toggle-joint between the cam-actuated means and the shaving tool, the feed motion imparted by the cam will be transmitted in a slower but more powerful and steadier movement, thereby insuring a smooth shaving operation and eliminating vibration and chattering which are sometimes caused by direct cam action. The shaving tool will be fed into the blank in a swinging feed movement about an axis at about a ten-degree angle with respect to its axis for performing a shaving operation, and for preventing the tool from dragging over the face 40 when being withdrawn. A contractile spring 237 connected at one end to the frame and at its opposite end to the tool holder withdraws the tool after the feed movement.

Two shaving operations will be performed on each blank, the first being of greatest duration and depth for removing the stock, and the second simply a short cleaning operation for removing the burr left by the slotting cutter. While in the present application of my invention, I employ a shaving tool, that is, one for removing only a small amount of material for securing an accurate finish as distinguished from a turning tool which is designed to take a heavier cut, nevertheless, a turning tool and the appropriate feed might be employed according to the nature of the particular work at hand.

*The slotting mechanism.*

A slotting cutter positioned at each of the slotting stations mentioned above, cuts a diametrical slot in the head of the blank positioned at its respective station. These slotting cutters, preferably in the form of saws or milling cutters 238 and 239 positioned at the first and second slotting stations above mentioned, are supported and fed by independent mechanisms similar in construction, a description of one of which with reference to the cutter 238 will suffice for both. Referring to Figs. 9 and 10, it will be seen that the slotting cutter or saw 238 is clamped between the collars 241 on an arbor 242 which is journaled in a carriage 243. This carriage mounted on dovetail ways 244 on the frame part 46 is adapted to be reciprocated in a plane parallel with the spindle axes for bringing its cutter into and out of cutting relation to the blank. The arbor will be continuously driven by the driving end 63 above mentioned, of a sectional driving shaft comprising said driving end, shown in Fig. 4, intermediate section 245 and a driven end 246, the latter being journaled in the carriage 243. A worm 247 and a worm gear 248 connect the driven end 246 of said sectional shaft and the saw arbor. Said intermediate shaft section 245 telescopes the driving and driven ends 63 and 246 and is connected thereto by diametrically opposed keys 240 slidable in key-ways in said shaft ends. A protective casing 248 incloses the intermediate portion of the sectional shaft. A cam 249, shown in Fig. 16, fixed to the cam shaft 64, is employed for imparting feed movement to each cutter carriage 243. This cam actuates a follower lever 251 which is connected by means of a rod 252 to its respective carriage 243. Said rod passes through the carriage as shown in Figs. 9 and 10 and has threaded on its forward end a manually adjustable stop 253, which abuts against a front face of said carriage and is adapted to be adjusted for varying the depth of the cutter feed, a suitable lock nut 254 being provided for securing the stop member 253 in adjusted position. A coil compression spring 255 acting between the frame part and the carriage serves to withdraw the cutter carriage after the feed has been finished. It will be evident that cutters of various size and shape might be carried by the arbor for performing operations other than slotting, and that the feed may be adjusted or altered according to the nature of the particular work.

*General operation.*

The machine will be continuously operated by the driving pulley 51. The several mechanisms described above, operated or controlled by cams on the cam shafts 64 and 73 will function in synchronism for producing a predetermined cycle of operations. Starting with the blanks in the conductor 75, the lowermost blank will be removed by the cradle 77 and positioned in the path of the pick-up fingers 79 and 81, which will pick up the blank and then after the cradle has been withdrawn, lower it into alignment with the opening in the chuck 136 at the inserting position. Reference may now be had to Figs. 20 to 27 inclusive, which show diagrammatically the principal operations, Fig. 21 showing the blank indicated by the letter A held by the pick-up fingers at the inserting position. At this position, the chuck 136 is in alignment with the blank A, being locked against displacement by the locking pin 186 as shown in Fig. 7, and being revolved at a high speed by the pulley 134 by reason of the indexing operation which brings said pulley into contact with the side 203 of the driving belt as shown in Fig. 20. The blank will now be inserted into the chuck 136 by action of the inserter 105, as shown in Fig. 22. Immediately following withdrawal of the inserter, the shaving tool 214 will be advanced and perform the initial shaving operation illustrated in Fig. 23. Upon completion of this operation the spindle carrier 131 will be indexed to the right, thereby bringing the first chuck 136 to the first sloting station and the second chuck 137 to the shaving station, as shown in Fig. 25. This indexing shifts the spindle pulleys with respect to the driving belt so that the pulley 135 will be driven by the belt side 204, as shown in Fig. 24, and the pulley 134 will be held against rotation by its respective braking device. Just after the spindle carrier has been thus indexed, the slotting cutter carriage will be advanced in a uniform feed movement, so that one or the other of the cutters 238 or 239 will perform a slotting operation. At the present stage, the blank A will be slotted by the cutter 238. During this slotting operation, a blank B will be moved to the inserting position, as shown in Fig. 25, inserted as shown in Fig. 26, and shaved as shown in Fig. 27. The slotting of the blank A and the first shaving of the blank B will be finished simultaneously, whereupon the slotting cutters will be quickly withdrawn and the spindle carriage will be indexed to the position shown in Fig. 29, thereby returning the first chuck to the shaving station and moving the second chuck to the second slotting station. This indexing also causes the first chuck to be revolved and the second chuck to be stopped as shown by the position of their respective pulleys in Fig. 28. Just after the blank A has been returned to the shaving station the tool 214 will again be advanced in a second shaving operation for removing the burr left by the slotting cutter, as shown in Fig. 29, and following this the blank A will be ejected as shown in Fig. 30. During the second shaving operation with respect to the blank A, the slotting cutters will be advanced and the second slotting cutter 239 will enter the blank B. The slotting of the blank B will continue during ejectment of the blank A, insertion of a new blank and until the finish of the first shaving operation thereon; or in other words, through the period indicated by Figs 29, 30, 21, 22 and 23. The foregoing illustrates the complete cycle of operations on a single blank A, and the start of these operations on a blank B. The same operations will be performed on the blank B as described with respect to the blank A, except that the slotting is done by a separate cutter. It will be noted that a finished blank will be ejected each time one of the chucks is positioned at the intermediate station and a new blank will be inserted.

Considering that blanks of a given size are discharged from the machine at about 44 per minute, it will be manifest that certain of the operations are performed with considerable rapidity. In spite of this comparatively high speed, the several operations are performed with such positiveness and precision as to insure absolute uniformity of product. These results obtained by reason of the novel principles of operation and organization of mechanisms herein disclosed and pointed out more particularly in the claims. It should be understood, however, that my invention contemplates broadly the application of these principles generally to shaving and slotting blanks and to performing similar operations. It follows, therefore, that many changes might be made in the design and construction of a machine for these purposes without departing from the spirit and scope of the invention as set forth in the appended claims.

I claim:

1. In a shaving and slotting machine, a first and a second chuck, and means for indexing them in one direction to position the first chuck at a shaving station and the second chuck at a second slotting station, and in the opposite direction to position the first chuck at a first slotting station and the second chuck at said shaving station, at which stations shaving and slotting operations are performed on blanks carried by the chucks.

2. In a shaving and slotting machine, means for shaving in succession at a shaving station blanks carried by a first and a second chuck, and means for slotting said blanks at independent slotting stations, the blank carried by the first chuck being slotted at a first slotting station and that by the second chuck at a second slotting station.

3. In a shaving and slotting machine, means for shaving blanks at a shaving station, means for slotting the blanks at a plurality of slotting stations, a carrier equipped with a plurality of blank-carrying chucks, and means for indexing the carrier to move both blank-carrying chucks in alternation to said shaving station and each to a separate slotting station.

4. In a shaving and slotting machine, means for performing a first and a second shaving operation on each blank at a shaving station, and means for slotting each blank, one at a first slotting station and another at a second slotting station, the slotting operation on each blank being peformed between the first and second shaving operations and while the other blank is at the shaving station.

5. In a shaving and slotting machine, a first and a second blank-carrying means, means for shaving the blanks at a shaving station, and means for slotting the blanks at a first and a second slotting station, the slotting operations being performed alternately at said slotting stations and the shaving operations being performed in succession at said shaving station.

6. In a shaving and slotting machine, a first and a second chuck, a first and a second slotting station, an intermediate shaving station, and means for indexing the chucks in succession to the shaving station and in alternation to their respective slotting stations.

7. In a shaving and slotting machine, a first and a second chuck, a first and a second slotting station, an intermediate shaving station, a driving pulley concentric with each chuck, a driving belt, both sides of which pass between said pulleys, and means for indexing the chucks in succession to the shaving station and in alternation to their respective slotting stations, whereby the pulleys will be alternately brought into contact with the respective sides of said belt to alternately drive the chucks.

8. In a shaving and slotting machine, a first and a second chuck, a first and a second slotting station, an intermediate shaving station, means for indexing the chucks in succession to the shaving station and in alternation to their respective slotting stations, and means for driving each chuck at the shaving station and stopping it at its slotting station.

9. In a shaving and slotting machine, a first and a second chuck, a first and a second slotting station, an intermediate shaving station, means for indexing the chucks in succession to the shaving station and in alternation to their respective slotting stations, and means rendered operative by said indexing operation for driving each chuck at the shaving station and stopping it at its slotting station.

10. The combination of a first and a second rotary chuck, a first and a second rotary cutter at a first and a second cutting station, respectively, a shaving tool intermediate said cutting stations, means for indexing said chucks in succession to said intermediate station and in alternation to their respective cutting stations, means for revolving each cutter at the intermediate station and for holding it against rotation at its respective cutting station, and means for simultaneously performing shaving operations on one blank at the intermediate station and on the other at the cutting station during the interval between each indexing.

11. In a shaving and slotting machine, the combination of a pair of laterally spaced chucks adapted to be indexed a first time to move the first chuck to a shaving station and the second chuck to a slotting station and to be indexed a second time to move said first chuck to another slotting station and said second chuck to said shaving station, a shaving tool for shaving each blank at the shaving station, and slotting tools, one for slotting each blank at its respective slotting station while a shaving operation is being performed on the other blank.

12. In a machine of the character described, the combination of a pair of spaced slotting cutters, an intermediate shaving cutter, and a pair of chucks adapted to be moved to position each in succession in operative relation to the shaving cutter and in alternation to their respective slotting cutters, whereby shaving and slotting operations may be simultaneously performed on blanks carried by the chucks.

13. In a machine of the character described, the combination of a pair of spaced slotting cutters, an intermediate shaving cutter, a pair of chucks adapted to be positioned successively in operative relation to the shaving cutter and alternately to one or the other of the slotting cutters, whereby shaving and slotting operations may be simultaneously performed on blanks carried by said chucks, and means for driving said chucks in alternation and simultaneously holding the undriven chuck against rotation.

14. In a shaving and slotting machine of the character described, the combination of a pair of rotary blank-carrying chucks adapted to be moved in unison back and forth between spaced slotting stations and an intermediate shaving station, to position said chucks in succession at the shaving station and alternately at their respective slotting stations, a shaving tool at said shaving station, and a slotting cutter at each slotting station.

15. A machine of the character indicated comprising a plurality of blank holders, operation stations exceeding by one the number of blank holders, and means for presenting each holder twice at one station and once at another for the performance of operations upon the blanks carried thereby.

16. The combination of a first and a second spindle each equipped with a chuck and a pulley, a first and a second rotary cutter at a first and a second cutting station respectively, a cutting tool intermediate said cutting stations, means for indexing said chuck spindles in succession to the intermediate tool and alternately to their respective cutting stations, and a driving belt in driving contact with each pulley when its spindle is moved to the intermediate tool and at such time out of contact with the other pulley.

17. In a machine of the character described, the combination with a pair of laterally spaced spindles each equipped with a chuck and a pulley, a driving belt both sides of which pass between said pulleys, means for shifting said pulleys back and forth in a plane intersecting their axes of rotation for alternately bringing the spindle pulleys into driving contact with the belt, means for holding each spindle against rotation when its pulley is out of driving contact with said belt, means for shaving the blank held in each chuck when it is being driven, and means for slotting each blank when it is held against rotation.

18. In a machine of the character described, the combination of a pair of spaced rotary cutters, an intermediate blank-inserting device, a pair of rotary chucks adapted to be shifted back and forth to bring each chuck alternately into registration with the blank-inserting device and the other chuck simultaneously into operative relation with one of said cutters, and a tool for shaving each blank while it is positioned intermediate said cutters.

19. In a machine of the character described, the combination of a pair of rotary cutters at spaced cutting stations, a blank-inserting device and a shaving tool at an intermediate station, a pair of rotary chucks adapted to be shifted in one direction in the plane of said stations to position the first of said chucks at the intermediate station and the second at one of said cutting stations and to be shifted in the opposite direction in said plane to position the second chuck at said intermediate station and the first chuck at the other cutting station, and means for driving each chuck at the intermediate station and for holding it against rotation at its respective cutting station.

20. In a machine of the character described, the combination with a pair of spaced slotting cutters and an intermediate shaving tool, of a carrier equipped with a pair of spindles movable back and forth for positioning said spindles in operative relation to said shaving and slotting cutters, a pulley and a chuck on each spindle, a belt both sides of which pass between said pulleys, a pulley over which said belt is trained, so arranged with respect to said spindle pulleys that the opposed sides of the belt alternately drive the spindle pulleys when they are moved into operative relation to the shaving tool, and a brake for each spindle pulley for stopping it when in operative relation to its slotting cutter.

21. A machine of the character described comprising a reciprocable carrier, a pair of spaced spindles on the carrier, a pulley and a chuck on each spindle, means for indexing the carrier in one direction to position the first chuck at a shaving station intermediate two slotting stations and a second chuck at the second slotting station, and in the opposite direction to position said first chuck at the first slotting station and said second chuck at said shaving station, means for inserting a blank into each chuck at the shaving station, a tool for shaving each blank at said shaving station, and a cutter at each slotting station for slotting the blank moved thereto.

22. A machine of the character described comprising a reciprocable carrier, a pair of spaced spindles on the carrier, a pulley and a chuck on each spindle, means for indexing the carrier in one direction to position the first chuck at a shaving station intermediate two slotting stations and a second chuck at the second slotting station, and in the opposite direction to position said first chuck at the first slotting station and said second chuck at said shaving station, means for inserting a blank into each chuck at the shaving station, a tool for shaving each blank at said shaving station, a cutter at each slotting station for slotting the blank moved thereto, and means for causing said shaving tool to perform a first shaving operation on each blank before it is slotted and while the blank in the other chuck is being slotted and for performing a second shaving operation after each blank has been slotted.

23. A machine of the character described comprising a reciprocable carrier, a pair of spaced spindles on the carrier, a pulley and a chuck on each spindle, means for indexing the carrier in one direction to position the first chuck at a shaving station intermediate two slotting stations and a second chuck at the second slotting station, and in the opposite direction to position said first chuck at the first slotting station and said second chuck at said shaving station, a driving belt both sides of which pass between said pulleys, each side for driving one of the pulleys when it is moved to the shaving station, means for inserting a blank into each chuck at the shaving station, a tool for shaving each blank at said shaving station, and a cutter at each slotting station for slotting the blank moved thereto.

24. In a shaving and slotting machine of the character described, the combination with a pair of chuck spindles movable back and forth into registration with a shaving station and a slotting station, of shaving and slotting tools, a pair of pulleys, and a driving belt both sides of which pass between said pulleys, one being adapted to drive one of the spindles when it is positioned at said shaving station and the other for driving the other spindle when at said station.

25. The combination of a reciprocable carrier, a pair of laterally spaced spindles journaled on the carrier and each equipped with a pulley, a third pulley at an operating station in juxtaposition to said spindle pulleys, a driving belt trained around said third pulley and both sides passing between said spindle pulleys, and means for indexing the carrier in one direction for moving one spindle pulley to said operating station and into driving contact with one side of said belt, and in the opposite direction for moving the other spindle pulley to said operating station and into driving contact with the opposite side of the belt.

26. The combination of a reciprocable carrier, a pair of laterally spaced spindles journaled on the carrier, and each equipped with a pulley, a third pulley at an operating station in juxtaposition to said spindle pulleys, a driving belt trained around said third pulley and both sides passing between said spindle pulleys, means for indexing the carrier in one direction for moving one spindle pulley to said operating station and into driving contact with one side of said belt and in the opposite direction for moving the other spindle pulley to said operating station and into driving contact with the opposite side of the belt, a braking device for each spindle, including a friction shoe, and means for moving the friction shoe into contact with its respective pulley when it is positioned remote from said operating station.

27. The combination of a reciprocable carrier, a pair of laterally spaced spindles journaled on the carrier, and each equipped with a pulley, a third pulley at an operating station in juxtaposition to said spindle pulleys, a driving belt trained around said third pulley and both sides passing between said spindle pulleys, means for indexing the carrier in one direction for moving one spindle pulley to said operating station and into driving contact with one side of said belt, and in the opposite direction for moving the other spindle pulley to said operating station and into driving contact with the opposite side of the belt, a braking lever on the carrier for each spindle pulley, each lever equipped at one end with a brake shoe and at its opposite end with a roller, means urging each brake shoe away from its pulley, and a cam for actuating each roller to engage its brake shoe with its respective pulley when such spindle is moved by indexing the carrier to a position remote from said operating station.

28. In a machine of the character described, in combination, a rotary blank-carrying chuck, a pivoted tool holder adapted to swing for carrying its tool in a cutting and a return stroke, a cam, and mechanism operated by said cam for swinging the tool holder in a feed movement including a toggle connection.

29. In a machine of the character described, in combination, a rotary blank-carrying chuck, a pivoted tool holder adapted to swing for carrying its tool in a cutting and a return stroke, a cam, and mechanism operated by said cam for swinging the tool holder in a feed movement including a toggle connection having universal joints to accommodate the swinging movement of the tool holder.

30. In a machine of the character described, in combination, a rotary blank-carrying chuck, a pivoted tool holder on an axis non-parallel with respect to the chuck and mechanism for advancing and retracting the tool holder including a toggle connection having universal articulations.

31. The combination with a rotary blank holder, of a pivoted tool holder on an axis non-parallel with respect to the blank holder, a cam, a block slidable transversely on said member, toggle arms connected by ball and socket connections to opposite ends of said block, one of said arms having a thrust connection with a relatively fixed part, and a ball and socket connection between the other arm and the tool holder, whereby feed movement from said sliding member will be transmitted to the tool holder.

32. In a machine of the character described, the combination of a carrier adapted to be indexed from one station to another, a pair of spindles journaled on the carrier, a chuck carried by each spindle, means on the carrier for opening and closing each chuck, a common operating member adapted to positively connect with either of said chuck opening and closing means at a given station, and means for indexing the carrier to alternately move the respective chuck opening and closing means to said given station.

33. The combination with a rotary blank holder, of a pivoted tool holder on an axis non-parallel with respect to the blank holder, a cam, a sliding member adapted to be moved in a tool feeding stroke by the cam, a block slideable transversely on said member, toggle arms connected by ball and socket connections to opposite ends of said block, one of said arms having a thrust connection with a relatively fixed member, and a ball and socket connection between the other arm and the tool holder, whereby feed movement from said sliding member will be transmitted to the tool holder, and means for varying the length of said feed movement.

34. The combination with a rotary blank holder, of a pivoted tool holder non-parallel with respect to the blank holder, and means for imparting feed movement to the tool holder comprising a power operated member, a blank slideable transversely on said member, a pair of toggle arms, one of said arms being pivotally connected to one end of said block and to a relatively stationary but adjustable part, the other arm being pivotally connected to the opposite end of said block and to the tool holder.

35. In a machine of the character described, the combination of a carrier adapted to be indexed from one station to another, a plurality of spindles journaled on the carrier, a chuck on each spindle, a rod slidable on the carrier beneath each spindle, means operated by each rod for closing its respective chuck, a cam-operated lever adapted to operatively connect with either of said chuck-closing rods at a given station, and means for indexing the carrier whereby the chuck-closing rods for said spindles will be moved one after another into operative relation to said cam-operated lever at said given station.

36. In a machine of the character described, the combination of a carrier equipped with a pair of laterally spaced rotary chucks and adapted to be indexed horizontally for positioning one chuck at a first slotting station, the other chuck at a second slotting station and both chucks successively at an intermediate shaving station, mechanism for feeding blanks one at a time to an inserting position at the slotting station, an inserter for inserting the blank at said inserting position into a first chuck at the shaving station, a shaving tool holder mounted for oscillation on a horizontally dispose axis at an angle with respect to the chuck axes and equipped with a shaving tool, means for oscillating said tool holder for feeding the shaving tool into the blank at the first station, a slotting cutter at each slotting station, and means for feeding said slotting cutters toward the chucks for slotting a blank carried by one or the other of said chucks.

37. In a machine of the character described, the combination of a carrier equipped with a pair of laterally spaced rotary chucks and adapted to be indexed horizontally for positioning one chuck at a first slotting station, the other chuck at a second slotting station, and both chucks successively at an intermediate shaving station, mechanism for feeding the blanks one at a time to an inserting position at the slotting station, an inserter for inserting the blank at said inserting position into a first chuck at the shaving station, a shaving tool holder mounted for oscillation on a horizontally disposed axis at an angle with respect to the chuck axes and equipped with a shaving tool, means for oscillating said tool holder for feeding the shaving tool into the blank at the first station, a slotting cutter at each slotting station, means for feeding said slotting cutters toward the chucks for slotting a blank carried by one or the other of said chucks, means for indexing said carrier, and means for causing said blank-feeding mechanism, inserter, tool holder, slotting cutters and indexing mechanism to function in timed relation, whereby to simultaneously perform, in succession, shaving and slotting operations at the shaving station and first slotting station, and at the shaving station and second slotting station.

38. In a machine of the character described, the combination of a first and a second chuck, a first and a second slotting station, a slotting cutter at each station, means for indexing the chucks to position the first chuck at the shaving station and the second chuck at the second slotting station, and for positioning the first chuck at the first slotting station and the second chuck at the shaving station, means for inserting a blank into each chuck at the shaving station, means for shaving the blank at said shaving station, a slotting cutter at each slotting station, means for causing each slotting cutter to slot the blank moved to its respective slotting station, and mechanism for causing said operations to be performed in predetermined timed relation.

39. In a machine of the character described, the combination of a carrier equipped with a pair of laterally spaced chuck spindles and adapted to be indexed horizontally, a chuck and a pulley on each spindle, a pulley positioned above said carrier in substantially the vertical plane of an intermediate cutting station, a driving belt trained over said upper pulley with both sides passing between said spindle pulleys, mechanism for indexing the spindle carrier in one direction for positioning a first chuck at an intermediate station and the second chuck at a second side cutting station, and in the opposite direction to position said first chuck at a first side cutting station and a second chuck at said intermediate station, a cutting tool at each of said stations for operating on a blank positioned at its respective station by indexing of said carrier, and mechanism driven by said upper pulley for indexing said carrier and operating said cutting tools.

44. In a machine of the character described, the combination of a carrier equipped with a pair of laterally spaced spindles each having a chuck and a pulley, a driving belt both sides of which pass between said pulleys, means for indexing said carrier in one direction to move the first chuck to an intermediate cutting station and the second chuck to a second side cutting station and in the opposite direction to position said first chuck at a first side cutting station and the second chuck at said intermediate cutting station, at which stations cutting operations are adapted to be performed on blanks carried by the chucks, each pulley spindle being brought into driving contact with one side of the belt when moved to the intermediate station, and means operated by said driving belt for indexing said carrier.

41. In a machine of the character described, the combinaiton of a carrier equipped with a pair of laterally spaced spindles each having a chuck and a pulley, a driving belt both sides of which pass between said pulleys, means for indexing said carrier in one direction to move the first chuck to an intermediate cutting station and the second chuck to a second side cutting station and in the opposite direction to position said first chuck at a first side cutting station and the second chuck at said intermediate cutting station, at which stations cutting operations are adapted to be performed on blanks carried by the chucks, each pulley spindle being brought into driving contact with one side of the belt when moved to the intermediate station, a cutting tool at each station, each pulley spindle being brought into driving contact with one side of the belt when moved to the intermediate station, and means operated by said driving belt for indexing the carrier and for imparting feed movement to said cutting tools.

42. In a machine of the character described, the combination of a carrier equipped with a pair of laterally spaced spindles each having a chuck and a pulley, means for indexing the carrier to different stations at which cutting operations are adapted to be performed upon blanks carried by the chucks, a driving belt both sides of which pass between said pulleys, each side of the belt adapted to drive one of the pulleys when the latter is moved to a given station, and means driven by said belt for indexing the carrier.

43. In a machine of the character described, the combination of a carrier equipped with a pair of laterally spaced spindles, each having a chuck and a pulley, means for indexing the carrier to position the chucks at different stations, one of which is common to both chucks, means for inserting a blank into each chuck at said common station, cutters for operating on the blanks at each station, a driving belt both sides of which pass between said pulleys whereby each pulley will be driven by one side of the belt upon being moved to said common station, and mechanisms driven by said belt for indexing the carrier, inserting the blanks and imparting feed movement to the cutting tools.

44. In a shaving and slotting machine, a carrier equipped with a pair of laterally spaced spindles, each having a chuck and a pulley, means for indexing the carrier in a rectilinear path for moving the chucks to different stations, cutting tools for operating on blanks carried by chucks at different stations, and a driving belt both sides of which pass between said pulleys, whereby each pulley will be driven by said belt when moved to a given station, said belt also imparting motion to said indexing means.

45. In a shaving and slotting machine, the combination of a first and a second chuck, a first and a second slotting cutter positioned at corresponding slotting stations, an inserter and a shaving tool at a shaving station intermediate said slotting stations, means for indexing the chucks in one direction to position the first chuck at the shaving station and the second chuck at the second slotting station and in the opposite direction for positioning the first chuck at the first slotting station and the second chuck at the shaving station, means for causing said inserter to insert a blank into each chuck at the shaving station, means for causing the shaving tool to perform a first shaving operation on the blank at the shaving station, means for causing each slotting cutter to perform a slotting operation on the blank positioned at its respective slotting station, said first shaving and slotting operations being simultaneously performed on blanks carried by the first and second chucks, and means for causing said shaving tool to perform a second shaving operation on each blank after it has been slotted.

GEDOR W. ALDEEN.